United States Patent [19]

Slator et al.

[11] 4,076,436
[45] Feb. 28, 1978

[54] STRESS RELIEVED TOOL ELEMENTS

[75] Inventors: Damon T. Slator; Archie W. Peil; Thomas R. Bishop, all of Houston, Tex.

[73] Assignee: Bowen Tools, Inc.

[21] Appl. No.: 655,442

[22] Filed: Feb. 5, 1976

Related U.S. Application Data

[63] Continuation of Ser. No. 541,642, Jan. 6, 1975.

[51] Int. Cl.² .................... F16B 7/18; E21B 17/042
[52] U.S. Cl. .................................. 403/343; 285/333; 403/41
[58] Field of Search ............... 403/343, 41; 285/333, 285/334, 114, 115; 85/46

[56] References Cited

U.S. PATENT DOCUMENTS

| 1,926,925 | 9/1933 | Wescott | 285/115 X |
| 2,045,520 | 6/1936 | Davison | 285/333 X |
| 2,110,825 | 3/1938 | Archer | 285/334 X |
| 2,606,778 | 8/1952 | Myhre | 403/343 X |

FOREIGN PATENT DOCUMENTS

| 1,194,349 | 1965 | Germany | 285/333 |

Primary Examiner—Andrew V. Kundrat
Attorney, Agent, or Firm—Pravel, Wilson & Gambrell

[57] ABSTRACT

Specially designed stress relief grooves for threaded end portions of tools and for collars on reciprocating or rotating drill string mounted tools.

6 Claims, 5 Drawing Figures

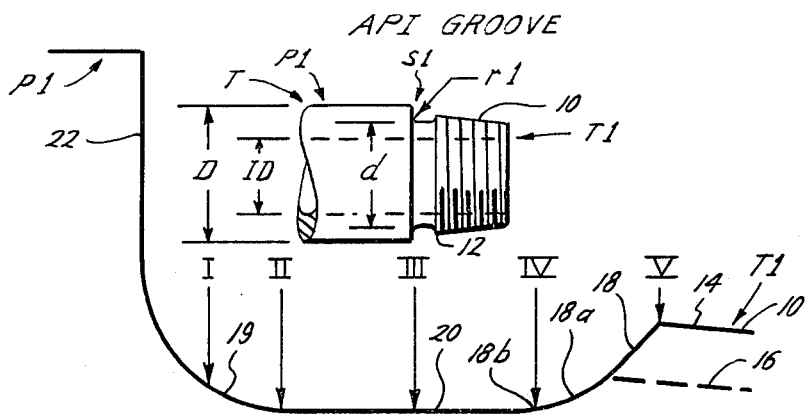
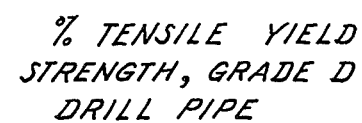
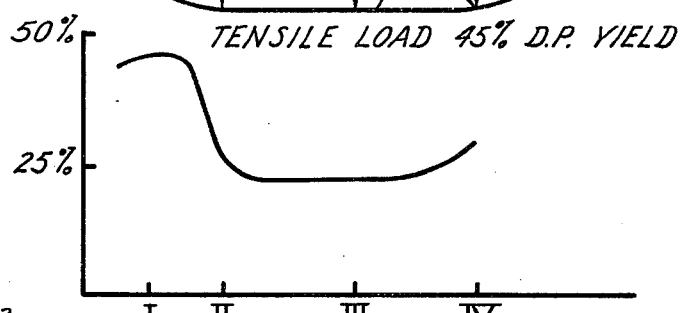
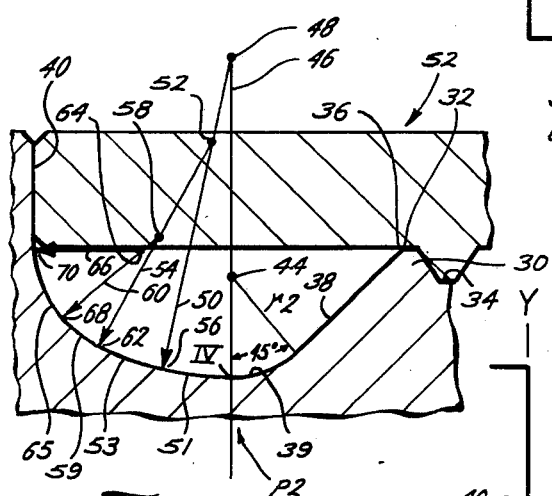
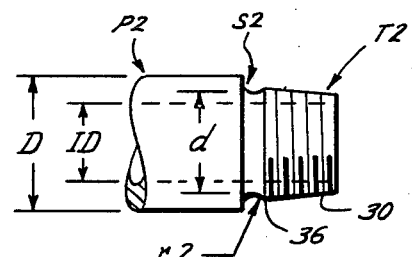
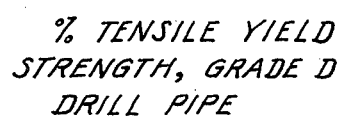
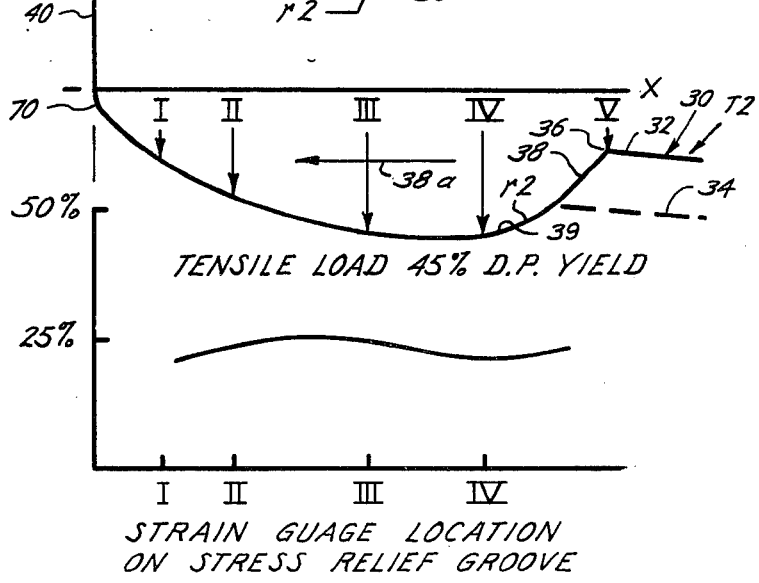

STRESS RELIEVED TOOL ELEMENTS

This is a continuation of application Ser. No. 541,642 filed Jan. 6, 1975.

BACKGROUND OF THE INVENTION

The field of this invention relates to the stress relieving of drill string tools.

In oil well drilling, the drill string and tools mounted thereon are subjected to various stresses from torsional bending and longitudinal loading. Generally, downhole tools are designed to withstand such stresses for extended periods. However, stress failure continues to be a problem in downhole tools having abrupt changes in sections where stress tends to concentrate.

SUMMARY OF THE INVENTION

The present invention provides a new and improved stress relief groove to be used adjacent to and between a threaded end of a drill string mounted tool body and an abrupt shoulder on the tool body. The stress relief groove of the preferred embodiment of this invention for the drill string mounted tool body has a first partially curved groove portion descending from the threaded end to a point of minimal wall thickness and a second groove portion ascending from the point of minimal wall thickness to the abrupt shoulder in a series of curved segments which are joined at common tangents to provide a continuously ascending curved grooved portion.

Furthermore, the present invention also includes a stress relieved tool element having an abrupt shoulder with a stress relief groove displaced from the abrupt shoulder for relieving stress concentrations adjacent the abrupt shoulder wherein the displacement is less than one-half the difference of the outside diameter of the tubular member and the outside diameter of the tool portion or mandrel of smaller diameter.

BRIEF DESCRIPTION OF THE DRAWINGS

FIG. 1 is a side view of a threaded end portion of a tubular member showing an API standard stress relief groove of the prior art, with a corresponding graph of stress vs. percentage of tensile yield strength at various positions along the API standard groove;

FIG. 2 is a side view of the stress relief groove of the present invention adjacent the threaded end of a tool body tubular member, with a stress vs. percentage of tensile yield strength graph depicting stress at various points along the stress relief groove of the present invention;

FIG. 3 is an enlarged sectional side view of the stress relief groove of FIG. 2 illustrating the formation of the groove;

DESCRIPTION OF THE PREFERRED EMBODIMENT

Figure 4:
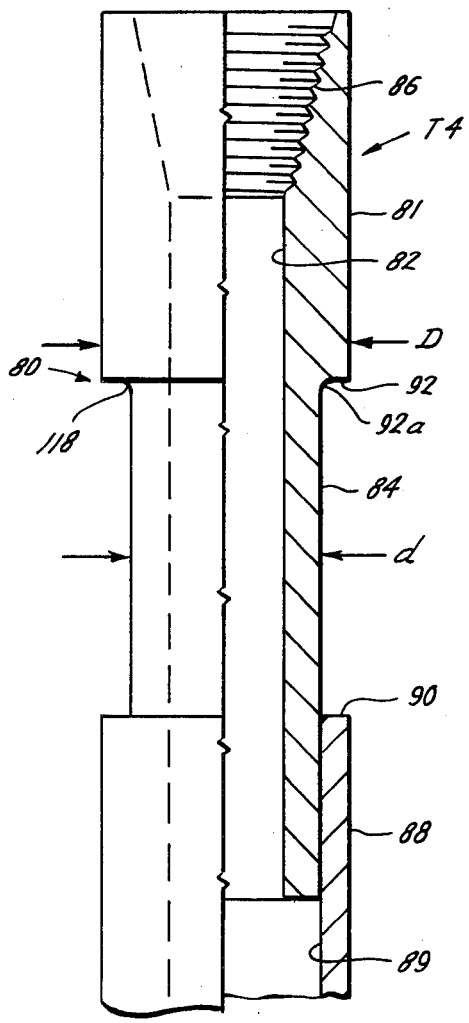
FIG. 4 is a side view, partly in section, showing a prior art tool body for a tool with an abrupt shoulder which forms a portion of reduced diameter.

In FIGS. 1-3, S1 designates generally a prior art stress relief groove disposed between a threaded end T1 and a tool body P1 of a drill string tool T which is adapted for mounting on the end of an oil well drill string. FIGS. 2 and 3 illustrate a new and improved stress relief groove S2 for a threaded end T2 of a drill string tool body P2. Unless otherwise noted, the components of this invention are made of steel or other high strength materials. Roman numerals I–V will be used in the description of grooves S1 and S2 to designate particular points of the grooves.

Considering the invention in more detail, FIG. 1 shows the threaded end T1 of a tool body P1 having a stress relief groove S1 which is disclosed in the prior art as an American Petroleum Institute (API) pin stress relief groove. The tool body P1 has an outer diameter D and an inner diameter ID, the difference between the outer diameter D and the inner diameter ID being equivalent to the wall thickness of the pipe P1. The threaded end T1 has threads 10 having a crest 14 and a root 16 which terminate at thread termination point V. The root 16 designates the maximum cut of the threads 10. An abrupt shoulder 22 joins the tool body P1 to the stress relief groove S1, which begins at thread termination point V. The letter $d$ designates the root diameter of the groove S1, which is the diameter measure at the point of minimum wall thickness in the groove, that is, the deepest part of the groove.

As is well known in the art, the API groove is generally formed as follows: Beginning at thread termination point V, a straight, inclined surface 18 is formed by a 45° taper inwardly with respect to the longitudinal axis of the tool body P1. A curved segment 18a is formed from the tapered surface 18 to a point at IV which is of minimum wall thickness. The segments 18 and 18a cooperate to form continuous segments from IV to V of the API standard groove. The segment 18a is formed by a radius of curvature of one-quarter inch. A flat surface 20 extends between points IV and II at a tangent from the end 18b of segment 18a. The distance between the flat surface 20 (as measured by diameter $d$) and the inside wall (small diameter ID) represents the minimum wall thickness of the tool body P1. Disposed in the region of points II, I and between point I and shoulder 22 of groove S1 is a standard curved segment 19 formed of a one-quarter inch radius which is formed tangent to the flat surface 20 and tangent to the abrupt shoulder 22. Thus, the standard API groove has a flat surface 20 disposed tangentially between two standard curved segments 18a and 19 which tangentially join the inclined surface 18 and abrupt shoulder 22, respectively.

FIG. 1 furthermore depicts a graph showing stress vs. the percentage of tensile yield strength for a grade D drill pipe at the stress relief groove S1. With the standard API groove, high stress in terms of percentage tensile yield strength (about 50%) exists in the areas adjacent the abrupt shoulder 22 and region I and a high stress in terms of tensile yield gradient exists between region I and region II. Between point II and point III the curve remains substantially uniform with a slight increase in the stress in terms of percentage tensile yield strength curve existing between points III–IV. The high stress in terms of percentage of tensile yield strength adjacent the abrupt shoulder 22 and the high gradient thereof between points I and II indicate the difficulties associated with the prior art in that such stress concentration in the range of 50% of the tensile yield strength significantly decreases tool life.

FIG. 2 shows a stress relief groove S2 disposed in similar fashion to stress relief groove S1 of FIG. 1 between a threaded end T2 and a tool body P2 with the pipe body P2 having an outer diameter D and an inner diameter ID as does the pipe body P1. The threaded end T2 includes threads 30 having a crest 32 and a root 34, with the threads 30 terminating at point 36, the dimension for the threads being identical for T1 and T2.

The stress relief groove S2 of the present invention is formed as follows: Beginning at thread termination point 36, an inclined surface 38 is formed at an angle of substantially 45° with respect to the longitudinal axis 38a of the pipe joint P2. This surface 38 corresponds to the inclined surface 18 of the API standard groove S1. Furthermore, in similar fashion a standard one-quarter inch radius r2 forming an arc 39 tangentially joins surface 38 to the area adjacent region IV of groove S2. This portion of the present invention is formed with the radius of curvature r2 traveling through approximately a 45° angle. Thus, the portion of the stress relief groove S2 between points IV and V are substantially the same as the standard API groove as described in FIG. 1.

The portion of the stress relief groove S2 immediately adjacent point IV denotes the point of minimum wall thickness of the tool body P2; for at point IV, the stress relief groove S2 is at its maximum depth and the thickness of the wall of the tool body P2 between the maximum depth at IV and the inner diameter ID is a minimum (FIG. 3).

The formation of the ascending portion of the stress relief groove S2 formed between points IV and an abrupt shoulder 40 is shown in detail in FIG. 3. Generally, this portion is formed by a series of curved segments 51, 53, 59 and 65 which are joined at common tangents to provide a continuously ascending curved groove portion wherein each curved segment has a consecutively smaller radius of curvature from the point of minimal wall thickness at point IV (diameter d) to the abrupt shoulder 40, wherein each radius of curvature has an origin on the preceding radius of curvature.

More specifically, as described hereinbelow, the arc 39 having radius r2 is tangent to inclined surface 38 and extends through a 45° angle to the point IV of minimal wall thickness. The radius of curvature r2 has a point of origin 44 which lies on a line 46 perpendicular to the longitudinal axis of the pipe joint P2. The line 46 also locates a point origin 48 for a radius of curvature 50 for segment 51, which is tangent to the arc 39 at minimum wall thickness point IV.

A point of origin 52 for segment 53, the next of the series of curved segments, having a radius of curvature 54 is located on the radius 50, which is the radius of the preceding curved segment 51. The curved segment 53 is tangent to the curved segment 51 at tangency point 56.

In similar fashion a point of origin 58 for a radius of curvature 60 is established on the radius of curvature 54 such that the radius 60 has a smaller radius of curvature than radius 54 which has a smaller radius of curvature than radius 50, with the arc 59 of radius 60 being tangent to the arc 53 of radius 54 at tangency point 62.

Lastly, a point of origin 64 for a radius of curvature 66, which is a smaller radius of curvature than radius 60, is located on the radius 60 such that the arc 65 of radius 66 and the arc 59 of radius 60 are tangent to one another at tangency point 68. Furthermore, the arc 65 of radius 66 is tangent to the abrupt shoulder surface 40 at tangency point 70. Thus, the ascending portion of the stress relief groove S2 of the present invention extends from the point of minimal wall thickness IV to the abrupt shoulder 40 in a series of curved segments 51, 53, 59 and 65 wherein each curved segment respectively has a consecutively smaller radius of curvature and is joined to one another at common tangent points 56, 62, 68 and 70 thus providing a continuously ascending curved groove portion.

Furthermore, each curved segment 51, 53, 59 and 65 is formed by a radius of curvature having a point of origin on each preceding radius of curvature. Furthermore, the first and last segments 51 and 65, respectively, of the ascending grooved portion are tangent to the minimal wall thickness at point IV and the abrupt shoulder 40 at point 70, respectively.

The results of this new and improved configuration for the stress relief groove S2 of the present invention is indicated in the stress percentage of tensile yield strength graph of FIG. 2. In comparison to the graph of FIG. 1, the graph of FIG. 2 shows a relatively flat distribution of the stress. In particular, note the drastic reduction in stress percentage of yield strength in the vicinity adjacent the abrupt shoulder 40 and extending through points I and II. With the continuously ascending grooved portion of the stress relief groove S2 of the present invention, the stresses adjacent the abrupt shoulder 40 are reduced to substantially one-half of those associated with the standard API groove of FIG. 1.

Furthermore, other features of the stress relief groove S2 of the present invention include the fact that the largest radius of curvature 46 is at the greatest depth indicated at point IV. Furthermore, the smallest radius of curvature 66 is adjacent the abrupt shoulder 40 with each radii of curvature decreasing between points IV and 70. Furthermore, the radius of curvature 66 terminates at the abrupt shoulder 40 at point 70 which occurs at the intersection of the plane of the crest 32 of the threads 30 of the threaded end T2 with the abrupt shoulder 40.

FIG. 4 refers to a tool T4 having a tubular body generally designated as 80 having a bore 82 therethrough. The tubular, tool body 80 includes a main body portion 81 formed integrally with a mandrel portion 84. The outside cylindrical surface of main body portion 81 has a diameter D and is joined to the mandrel portion 84 having a smaller diameter d by abrupt shoulder 92. The tool T4 is adapted to be mounted with a pipe string (not shown) by "box" threads 86.

A movable, reciprocating tool member 88 having bore 89 therethrough is mounted onto the mandrel portion 84 of the tool body 80. The bore 89 is of a slightly larger diameter than the outside diameter d of the mandrel portion 84 such that the tool body 88 may reciprocally slide along the mandrel 84. The reciprocating tool member 88 is also mounted for rotation but may be confined against rotation by keys, splines or the like. The tool body 80 and reciprocating tool member 88 are common to various drill string mounted tools. The tool member 88 has an abrupt shoulder or rim 90 which engages tool body shoulder 92 during reciprocation. Large stress concentrations which tend to cause a reduction in tool life manifest at the corner 92a formed by shoulder 92. Undesirable stress concentration at 92a on the tool member 80 can be caused by bending, torsional impact, or tensile loading applied to the tool body 80.

A fillet 118 is machined at corner 92a to reduce such undesirable stress concentration, but the size and effectiveness of the fillet 118 is limited because the shoulder 92 must provide a flat area to receive mandrel rim 90.

Figure 5:
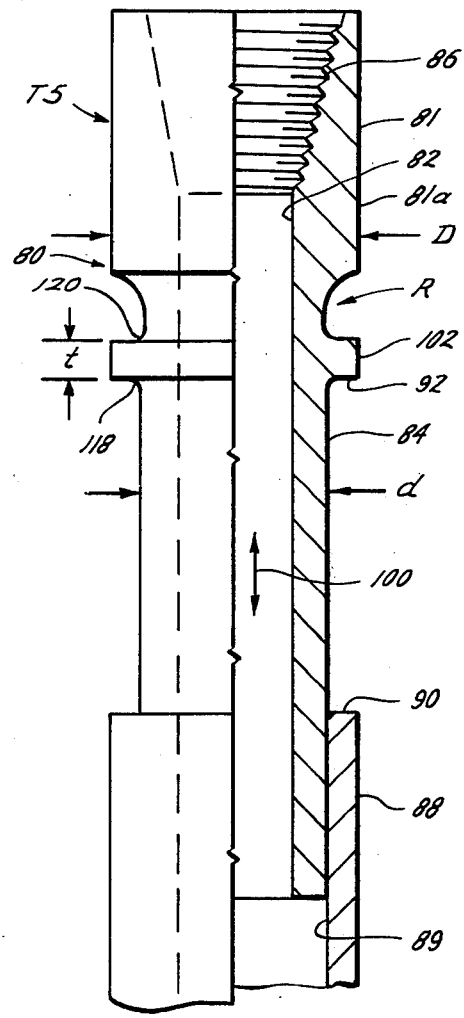
FIG. 5 is a side view, partly in section, showing a displaced stress relief groove of an alternate embodiment of this invention for the tool body of FIG. 4.

FIG. 5 indicates the tool T5 of the preferred embodiment of this invention. Tool T5 is very similar in structure to the tool T4 and the like numbers and letters will designate like parts. The tool T5 is a drill string mounted tool having a tubular body 80 which includes the main tool body portion 81 having diameter D joined to mandrel body portion 84 by abrupt shoulder 92. Reciprocating tool member 88 is mounted onto the mandrel portion 84 for reciprocal longitudinal movement in the direction of arrow 100, of the main tool body 80.

In order to reduce the stresses adjacent abrupt shoulder 92 due to bending, torsional tension, or impact loading, a displaced stress relief groove R is formed in the outer surface 81a of the main tool body 81. An annular collar 102 is formed by the displaced groove R and separates the displaced stress relief groove R from the abrupt shoulder 92. It has been experimentally found that the longitudinal thickness t of the annular collar 102 should be less than one-half the difference of the outside diameter D of the tubular member 81 and the outside diameter d of the mandrel 84.

The displaced stress relief groove R includes a fillet portion 120 opposing the first fillet 118, the fillet 120 being adjacent to the annular collar 102. For results which significantly increase the life of the tool T5, the fillet 120 of the displaced stress relief groove has a larger radius of curvature than the opposing fillet 118. The remainder of the displaced stress relief groove R is formed of one or more tangentially connected, adjacent radii of curvature such as previously described.

By displacing the displaced stress relief groove R by the hereinabove described longitudinal distance t, the magnitude of stress concentrations developed at the corner 92a at fillet 118 is significantly reduced. This becomes particularly important when a tool is required to function within a very narrow proximity of the material yield stress.

For example, if a low alloy steel tool T4 (ultimate tensile strength, 150,000 psi; yield strength, 125,000 psi) was stressed at the corner 92a of mandrel portion 84 and shoulder 92 at 80% yield strength (100,000 psi), a life of no more than 100,000 cycles could be expected. Such a short life is not satisfactory for any drill string mounted tool. With the use of stress relief of this tool T5, however, the fillet stresses at 118 are reduced to or below 65,000 psi, which is approximately 43% of ultimate tensile strength, thereby ultimately increasing tool mandrel life beyond a minimum acceptable 10,000,000 cycle range.

The foregoing disclosure and description of the invention are illustrative and explanatory thereof, and various changes in the size, shape, and materials as well as in the details of the illustrated construction may be made without departing from the spirit of the invention.

We claim:

1. A drill string mounted tool having a threaded end which is joined to an abrupt shoulder by a new and improved stress relief groove, comprising:
    a first partially curved groove portion descending from said threaded end to a point of minimal wall thickness where said groove is the deepest; and
    a second groove portion ascending from said point of minimal wall thickness to said abrupt shoulder in a series of curved segments which are joined at common tangents to provide a continuously ascending curved groove portion, each curved segment having a consecutively smaller radius of curvature from said point of minimal wall thickness to said abrupt shoulder whereby stress concentration is substantially reduced between said threaded end portion and said abrupt shoulder.

2. The structure of claim 1, wherein:
    each curved segment is formed by a radius of curvature, wherein, from said point of minimal wall thickness to said abrupt shoulder, each radius of curvature has an origin on said preceding radius of curvature.

3. The structure of claim 1, wherein:
    said radius of curvature of said second groove portion is substantially perpendicular to said abrupt shoulder where said second groove portion meets said shoulder.

4. The structure of claim 3, wherein:
    said second groove portion terminates at said abrupt shoulder at the intersection of the plane of the threads of the threaded end with said abrupt shoulder.

5. The structure of claim 1, wherein said first groove portion includes:
    a first straight inclined section originating adjacent said threaded end and extending inwardly therefrom being at substantially a 45° incline with respect to the longitudinal axis of the pipe; and
    a second curved section adjacent to and aligned with said first section, said second section being in tangential alignment with said first section and tangent to said point of minimal wall thickness.

6. The structure of claim 5, wherein:
    said second curved section subtends substantially an arcuate 45° angle between said tangential alignment with said first section and said tangential alignment at said point of minimal wall thickness.

* * * * *